Oct. 21, 1941.  W. H. HANNI ET AL  2,259,689
APPARATUS FOR COSSETTING ROOTS AND THE LIKE
Filed Nov. 13, 1940  4 Sheets-Sheet 3
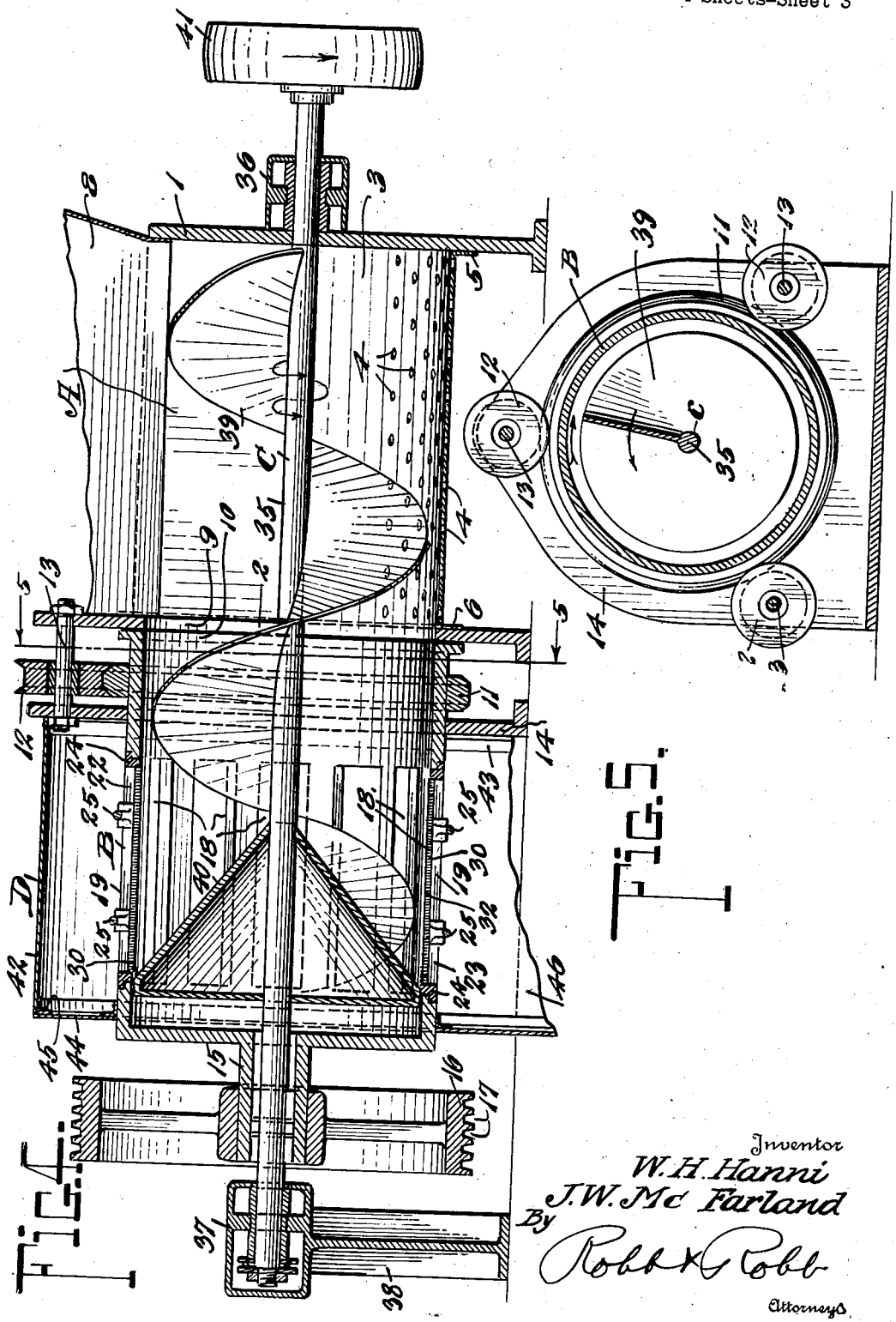

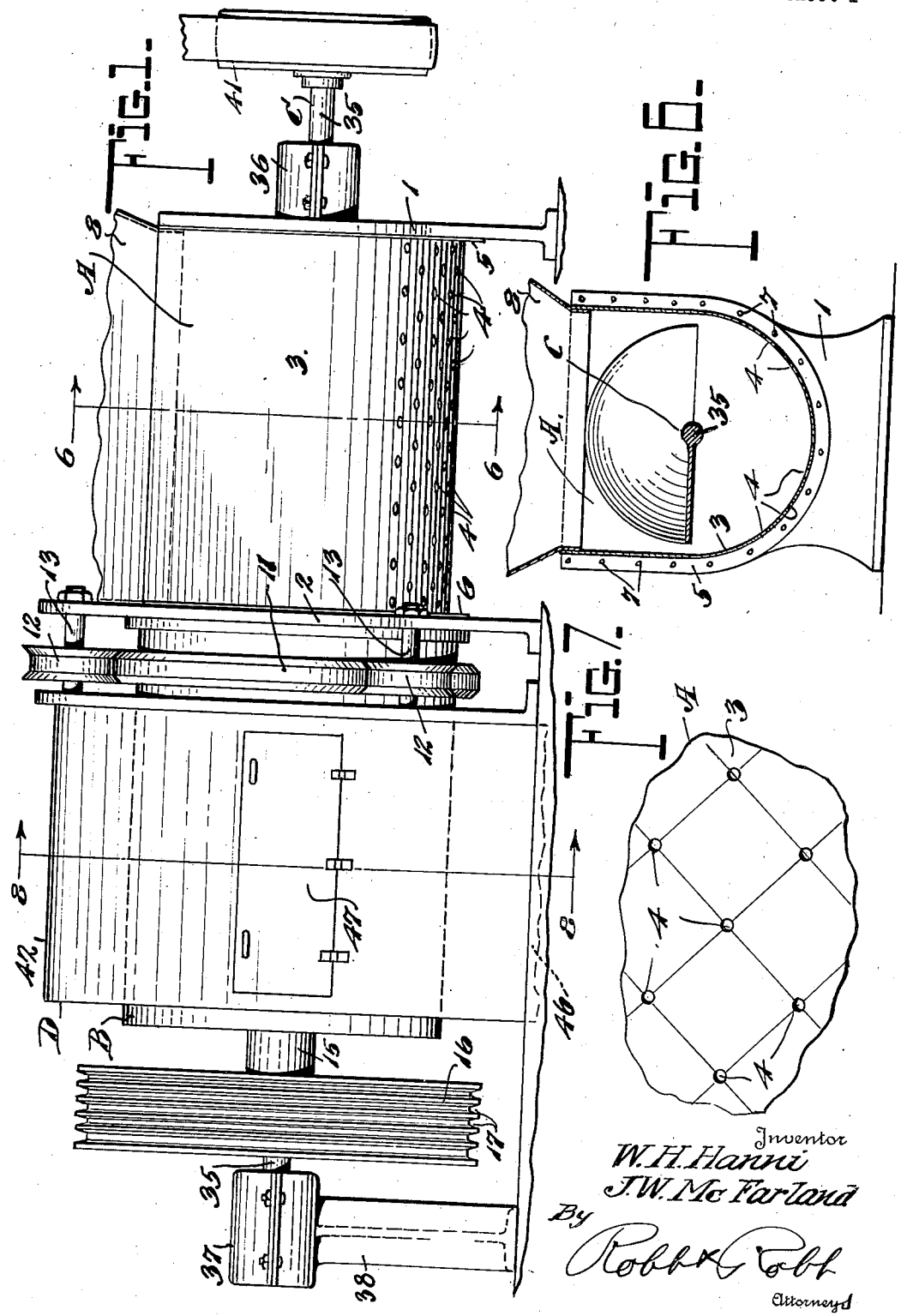

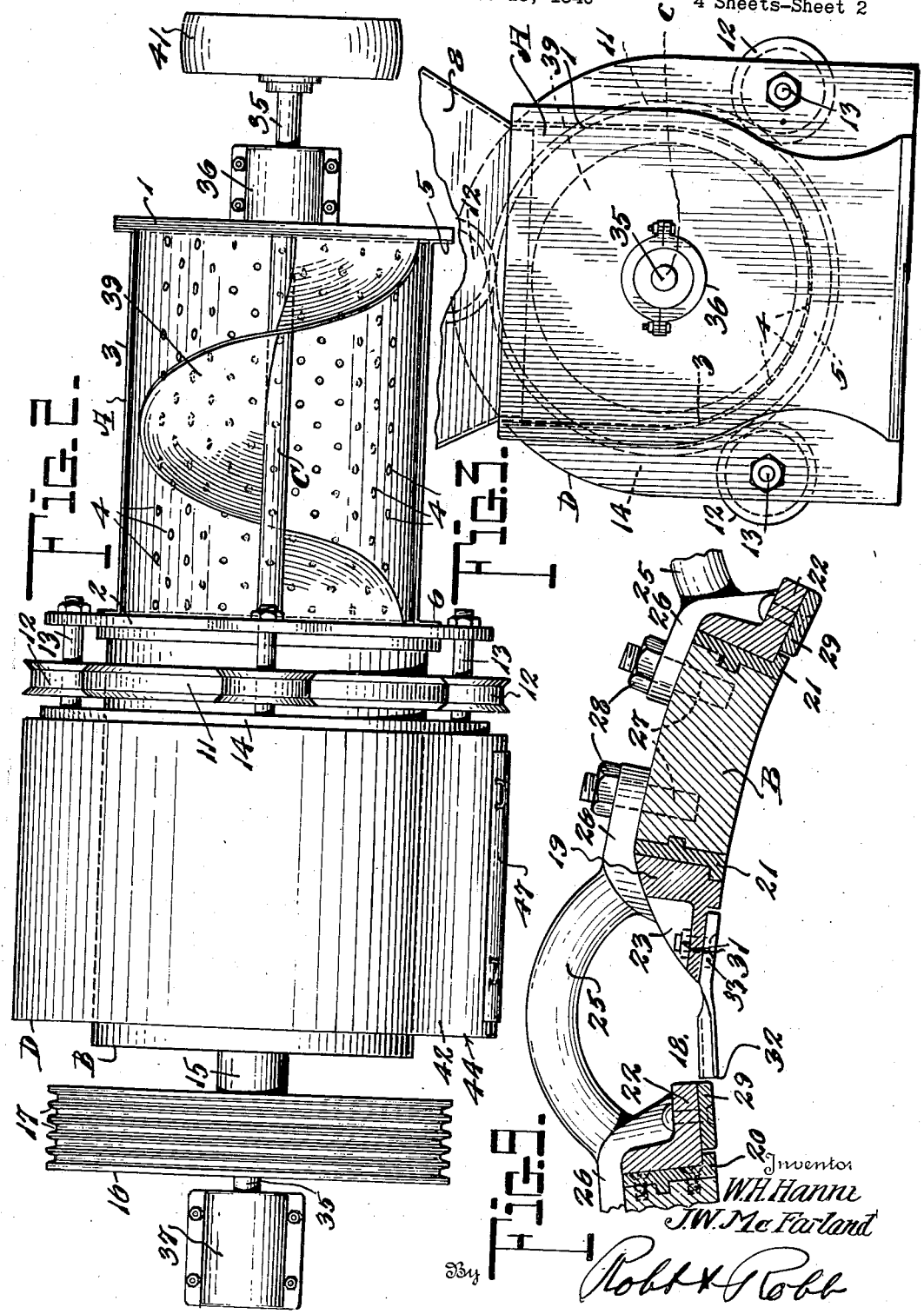

Oct. 21, 1941.  W. H. HANNI ET AL  2,259,689
APPARATUS FOR COSSETTING ROOTS AND THE LIKE
Filed Nov. 13, 1940  4 Sheets-Sheet 4
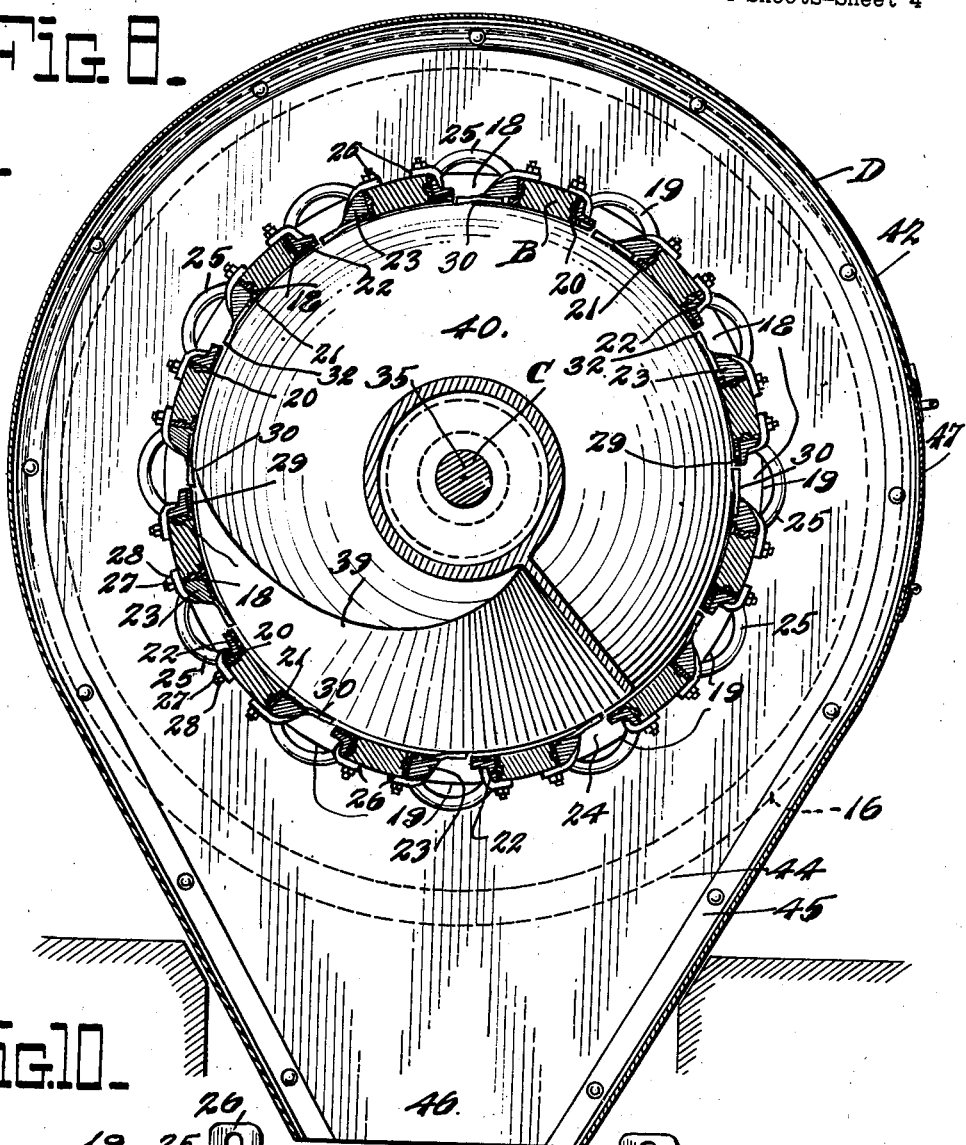
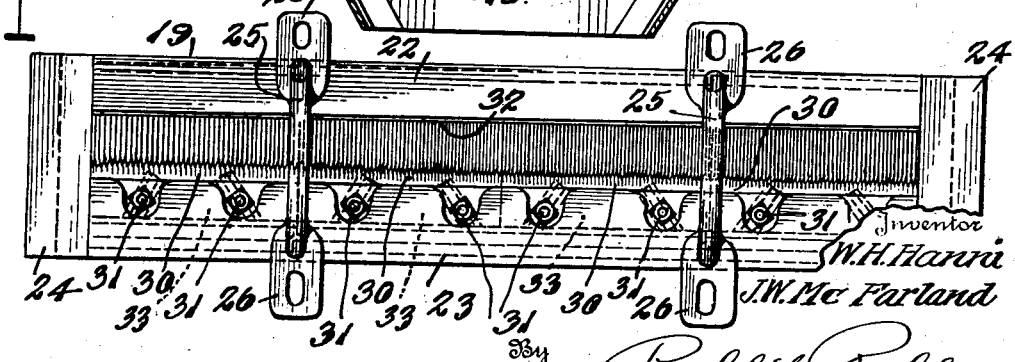

Patented Oct. 21, 1941

2,259,689

UNITED STATES PATENT OFFICE 2,259,689

APPARATUS FOR COSSETTING ROOTS AND THE LIKE

Walter H. Hanni, Spanish Fork, Utah, and John W. McFarland, Sugar City, Idaho, assignors to Utah-Idaho Sugar Company, Salt Lake City, Utah, a corporation of Utah Application November 13, 1940, Serial No. 365,544

5 Claims. (Cl. 146—90)

The present invention relates to improvements in food cutters, and more particularly to root cutters for sugar beets and the like, in which the beets are cut up in strings or cossettes.

In preparing sugar beet roots for treatment in the manufacture of beet sugar, the beet roots are first cleaned and then cut into long strips known in the industry as cossettes. These cossettes are substantially square in cross section and rather small, about $\frac{3}{32}''$ square. The slicing of the beet roots in the above manner greatly assists in the diffusion process in which the sugar is extracted.

We are aware that machines for producing these cossettes are not new, but in certain of these machines in the prior art the product is very inferior to that obtained in our machine. There is also in these prior machines a considerable waste due to the inefficient feeding means which feeds the material to the cutter blades, since a uniform pressure of the root material on all of the knives at all times is not effected which enables the rotor to cut through its entire circumference and length.

Another difficulty existing in the prior machines is that these machines do not have adequate means for maintaining the parts in alignment, resulting in considerable wear and loss of efficiency.

Our invention eliminates or reduces the above noted objections, and the quality of our cossette is greatly increased, and, in addition, our improved feeding means will produce better cossettes and in a greater quantity for a given time than in any of the prior art machines of which we are aware.

An object of the invention is therefore the provision of rotary cutting means and cooperative rotary feeding means whereby the root material is maintained in contact with the cutting means until substantially the entire root is cut.

A further object is the provision of rotary cutting means having the form of a cylinder which is provided with cutters near its periphery, and a feeding device for feeding the root material through the cylinder and for moving said material outwardly toward the cutters to cut the same into cossettes.

A still further object is the employment of a rotary cutting cylinder having a plurality of cossetting knives at its periphery and a feeding worm for feeding the material into and through the cylinder in contact with the cutting knives, including an associated spreading or conical part to engage the roots as they are fed axially into the cylinder by the worm and are being cut, said conical part effecting a radial component of movement to the root material, as well as the axial movement aforesaid.

Another object is the provision of supporting means for the cutting cylinder to reduce the tendency of misalignment of the cylinder with respect to the feeding worm and with respect to a feed hopper opening.

A still further object is the provision of cylinder aligning and bearing means for supporting the open end of the cylinder externally at spaced points around the periphery of the said cylinder and located on the feed hopper, and the provision of supporting means at the other or closed end cooperating with the feed worm to efficiently maintain the cylinder in alignment with the feed hopper opening and with the feeding worm.

A still further object is the provision of cutter or cossetting means mounted in frames removably disposed in the wall of the cylinder for convenient renewal or replacement.

In the accompanying drawings:

Figure 1 is a side elevation of our improved root cutting apparatus, a portion of the flared hopper extension being broken away;

Figure 2 is a top plan view of the apparatus shown in Figure 1, the flared hopper extension being removed;

Figure 3 is an end elevation of our improved apparatus, the upper portion of the hopper extension and bearing roller for the cylinder being broken away;

Figure 4 is a vertical, longitudinal sectional view, parts being broken away;

Figure 5 is a transverse sectional view taken on the line 5—5 of Figure 4 and disclosing particularly the roller mounting for the open end of the cossetting cylinder;

Figure 6 is a transverse sectional view on the line 6—6 of Figure 1, part of the flared hopper extension being broken away;

Figure 7 is an enlarged fragmentary plan view showing the spacing arrangement of the perforations in the bottom of the feed hopper;

Figure 8 is an enlarged transverse sectional view taken approximately on the line 8—8 of Figure 1, and showing the arrangement of the cossetting frames in the cylinder, the feeding worm, its associated spreading cone, and the cossette collecting casing surrounding the cutter cylinder;

Figure 9 is an enlarged fragmentary sectional view through one of the cossette knife frames; and Figure 10 is a plan view of one of the cossette knife frames, as seen in Figure 9.

Like reference characters refer to like parts in the several figures of the drawings, in which the feed hopper A comprises the two end plates 1 and 2, and an intermediate sheet metal U-shaped side and bottom wall member 3. The lower portion or bottom of the member 3 is semi-circular in cross section, as seen in Figures 4 and 6, and has a plurality of equally spaced perforations or drain holes 4.

The front and rear edges of the member 3 are flanged at 5 and 6, and suitably secured to the respective end plates 1 and 2 by any suitable means, such as bolts or rivets 7.

Inserted in the upper opening or charging end of the hopper A is a removable flared hopper extension 8, as clearly seen in the drawings, and the hopper end plate 2 is provided with a rather large discharge opening 9.

The cossetting cylinder B, as seen in Figures 4 and 8, is formed with a flanged open end 10 disposed adjacent the side plate 2 and having an internal diameter corresponding to the diameter of the opening 9 through the plate 2.

The supporting means for the open end portion of the cossetting cylinder B consists of a beveled bearing ring 11 secured to the cylinder near said end, which ring is maintained in axial alignment with the discharge opening 9 of the feeding hopper by three grooved guide rollers 12 equally spaced around the cylinder on supporting shafts 13 arranged parallel to the axis of the cylinder B and having one end secured in suitable apertures in the hopper end plate 2.

Another supporting plate 14 surrounds the cylinder B near the plate 2 and is provided with openings for supporting the other ends of the guide roller shafts. The closed end of the cylinder B is journaled on the drive shaft for the feeding worm C, later to be described in detail, and this cylinder end bearing consists of a sleeve-like extension 15 on which the cylinder drum pulley 16 is received. This pulley may be suitably driven from any adequate power source, such as a motor (not shown), through the conventional V belt drum. The pulley 16 is disclosed in the drawings as provided with a multi-grooved face 17 to accommodate these drive belts.

The cylinder B is provided in its side wall, as seen in Figures 4, 8 and 9, with a plurality of cossette cutter frame-receiving openings 18 of elongated rectangular form, and while the drawings disclose twelve of these openings, it is obvious that this number may be increased or decreased, depending upon the size and capacity of the cossetting apparatus.

Referring now to Figures 9 and 10, the cossette cutter frames are indicated generally by the reference numeral 19 and are mounted in the openings 18 on special and preferably hardened flanged supporting plates 20 and 21 interlockingly carried in the openings 18 and disposed adjacent the front and rear edges respectively of the openings with respect to the direction of rotation of the cylinder B. Similar flanged supporting plates across the ends of the openings may also be provided, if so desired.

The cossette cutter frame 19 is substantially rectangular and tapered toward the axis of the cylinder B, as clearly seen in the drawings, and may be fabricated or in the form of a casting or forging, and comprises a front bar 22, rear bar 23, end bars 24, and connecting bars 25 between the front and rear bars 22 and 23. These connecting bars extend beyond the front and rear edges of the frame, at which point they are flattened and apertured at 26 to be assembled over the studs 27 as the frames 19 are inserted in the openings 18 in the cylinder B. Nuts 28 secure the frames in place.

The front bar 22 is provided with a thickness gauge wear plate 29 which is disposed in front of the cutting edge of the cossette cutter plate 30, as seen in Figure 9. The size of the cossette may be varied by changing or replacing these wear plates 29 with others of a different thickness, or by placing shims under the knives.

The rear bar 23 carries the cutters, as seen in Figures 9 and 10, which are secured in cutting position in the frame by the bolts 31. The cutters are of the conventional Maguin type, as disclosed in Patent No. 1,241,702 and consist of a plate having a thin zigzag cutting edge 32, and, as shown in our drawings, are four in number to each cutter frame. This number would be increased or decreased depending on the length of the cylinder B or the frame 19. If desired, a single cutter of the entire length of the frame may be used. These cutters are provided with diagonally-slotted rear supporting portions 33 which are maintained in contact with the lower face of the rear bar 23 of the cossette frame by the securing bolts 31.

In order to feed beets or other material into the cylinder B and through the same in contact with the cutters, we provide the previously mentioned feeding means or worm C which consists of the worm shaft 35 suitably journaled at the hopper end in the supporting bearing 36. The opposite end of the shaft passes through the sleeve extension 15 of the cylinder, constituting a support therefor, and is journaled in a supporting bearing 37 carried on the standard 38. A feeding worm 39 is secured on the shaft 35 and extends from a point adjacent to the inner surface of the hopper end plate 1 to a point near the closed end of the cossetting cylinder B and beyond the ends of the cutter frames 19. The supporting shaft is also provided with an enlarged or conical member 40 with its base facing the closed end of the cylinder. The maximum diameter of the worm and of the base of the conical member is substantially the same and slightly less than the internal diameter of the cylinder, so that the periphery of the worm operates close to the cutting edge of the cutting plates 29.

The feed worm shaft is driven by any suitable means and preferably by a drive pulley or the like 41 secured to the end of the shaft 35 projecting through and beyond the bearing 36 on the plate 1.

It will thus be observed that the feeding worm 39 and the cossetting cylinder B may be independently rotated, and while we prefer to rotate these two elements in opposite directions, or, in other words, rotate the cossetting cylinder in one direction and the feeding worm shaft in the opposite direction, satisfactory results can also be attained by rotating the cylinder and worm in the same direction, but at different respective speeds.

Surrounding the cossetting cylinder B is the cossette-receiving casing D, as seen particularly in Figures 1 to 4, and 8. The casing comprises a sheet metal cylindrical wall 42 spaced from the periphery of the cossetting cylinder B and extending beyond the ends of the cossetting frames 19. One end of the wall is secured through a corner angle strip 43 to the plate 14 previously mentioned, this plate constituting a closure for this end of the casing D, as well as a support for the shafts 13 of the cylinder supporting rollers 12. Another end plate 44 is secured to the cylindrical wall 42 by angle strip 45, this plate having an opening therein to receive the cylinder B.

The sides and end wall 44 of the casing D are extended downwardly to form a cossette-discharging mouth 46 below which the cossettes may be collected in any suitable or desirable way.

The cylindrical wall 42 of the casing D is provided with a door 47 of suitable dimensions so that the cossette frames may be inspected or removed therethrough when this is necessary.

Operation

The beet roots are first thoroughly cleaned to remove all dirt, etc., and they are then dumped into the flared hopper extension 8 and feed hopper A, where they will fall into and around the feeding worm 39 which is rotating in the direction of the arrow in Figures 4 and 9. Any surplus water, dirt, etc. will be drained off through the apertures 4 in the bottom of the feed hopper A, and, if desired, water may be introduced as the roots are placed in the hopper.

The worm feeds the roots through the open end of the feed hopper and into the open end of the cossetting cylinder B, operating preferably in the reverse direction as indicated by the arrow.

As the beet roots are advanced along the cylinder B toward the closed end they engage the inwardly-projecting ends of the cossetting knives of the cutter plates 30 and are cut into strips or strings, which pass outwardly through the openings in the cossette cutter frames 21 mounted in the wall of the cylinder carrying the cutter knives, and are discharged into the collecting casing D in a suitable receptacle (not shown) disposed below the discharge mouth 46 of the casing. Afterwards they are processed in the usual way to remove the sugar from them.

Certain of the beet roots that work toward the center of the cutting cylinder, or are not in contact with the cutter knives as they are advanced along the cylinder by the worm C, finally engage the conical portion 40 of the feed worm, and are then moved outward into engagement with the cutting knives and, in this manner, all of the roots are evenly and uniformly cut into cossettes without any inefficiency in the machine or waste due to partial cutting of the roots. Our improved "three point" exterior bearing roller support for the cossetting cylinder B and the worm shaft bearing support for the cylinder at its other end assure positive alignment of the working parts at all times and makes it possible to reduce the clearance between the periphery of the worm and its conical portion, and the cutting knives, to a minimum.

What we claim as new and desire to secure by Letters Patent is:

1. In a cossetting machine of the class described, a feeding hopper for receiving beet roots or the like to be cossetted having a perforated bottom and open at one end for discharging the roots therefrom, a rotary cossetting cylinder having longitudinal openings in its peripheral wall, cossetting means disposed in said openings, comprising a removable frame having cossetting knives removably disposed in said frame, means for feeding the roots from the feeding hopper into and along the cossetting cylinder in contact with said cossetting means comprising a worm extending through said hopper and cylinder having a conical end portion for moving the roots outwardly toward the peripheral wall of the cylinder and said cossetting means, and means for rotating the worm.

2. In a machine of the class described, a feeding hopper having a perforated bottom and an open discharge end, a rotary cossetting cylinder closed at one end and having an open end facing the discharge end of said hopper, bearing means for supporting said cylinder adjacent its open end, said cylinder having longitudinal openings in the peripheral wall thereof, cossetting knives removably disposed in said openings, a worm shaft extending longitudinally through said cylinder and said feeding hopper having a feeding worm thereon in said feeding hopper and extending into said cossetting cylinder, said worm terminating in a conical portion with its base adjacent one end of the cossetting openings in the cossetting cylinder, one end of said cylinder having a sleeve-like extension surrounding said worm shaft and journaled thereon, and driving means on the worm shaft and on the cylinder extension for rotating said worm and said cylinder respectively.

3. In a cossetting machine of the class described, comprising a feeding hopper open at its top and having a semi-circular perforated bottom and an open discharge end, a rotary cossetting cylinder having a closed end and an open receiving end disposed adjacent the discharge end of said hopper, a bearing support for the open end of said cylinder comprising a pair of spaced plates adjacent the open end of the cylinder, a plurality of rollers spaced about the cylinder for engaging the wall thereof and carried between said plates, a worm shaft extending through said hopper and cylinder and having a bearing connection with the closed end wall of the cylinder, and spaced bearing supports for the opposite ends of said shaft, said shaft having a worm carried thereby extending from within said feeding hopper into said cylinder and terminating in a conical end portion with its base facing the closed end of the cylinder.

4. In cossetting apparatus of the class described, a pair of spaced supports, a feeding worm carried thereby between said supports having a conical portion with its base adjacent one end of said shaft and having a feeding worm thereon of substantially the diameter of the base of said conical portion and extending from said base portion around said shaft toward the other end of the shaft, a driving pulley on one end of the shaft for rotating the worm, a feeding hopper surrounding a portion of the worm having an open top and discharge end, a rotary cossetting cylinder enclosing the balance of said worm and said conical portion having a closed end and an open end adjacent the open end of the hopper, said cylinder having cossetting cutter-receiving openings in its walls and a sleeve-like bearing extension on its closed end surrounding said worm shaft and constituting a bearing connection between said shaft and said cylinder and located between the base of the conical portion and the end of the shaft, a beveled bearing ring on said cylinder near its open end, a supporting plate surrounding said cylinder adjacent the beveled bearing ring, a plurality of bearing shafts extending from said plate parallel to the axis of said rotary cylinder and across the plane of said bearing ring, grooved bearing rollers carried by said shafts in engagement with the beveled bearing ring for supporting the open end of the cylinder in receiving position with respect to the discharge end of said hopper, and a drive pulley on the sleeve-like bearing extension of the cossetting cylinder for rotating the same independently of the feeding worm.

5. In cossetting apparatus of the class described, a pair of spaced supports, a feeding worm carried thereby between said supports having a conical portion with its base adjacent one end of said shaft and having a feeding worm thereon of substantially the diameter of the base of said conical portion and extending from said base portion around said shaft toward the other end of the shaft, a driving pulley on one end of the shaft for rotating the worm, a feeding hopper surrounding a portion of the worm having an open top and discharge end, a rotary cossetting cylinder enclosing the balance of said worm and said conical portion having a closed end and an open end adjacent the open end of the hopper, said cylinder having cossetting cutter-receiving openings in its walls and a sleeve-like bearing extension on its closed end surrounding said worm shaft and constituting a bearing connection between said shaft and said cylinder and located between the base of the conical portion and the end of the shaft, a beveled bearing ring on said cylinder near its open end, a supporting plate surrounding said cylinder adjacent the beveled bearing ring, a plurality of bearing shafts extending from said plate parallel to the axis of said rotary cylinder and across the plane of said bearing ring, grooved bearing rollers carried by said shafts in engagement with the beveled bearing ring for supporting the open end of the cylinder in receiving position with respect to the discharge end of said hopper, a drive pulley on the sleeve-like bearing extension of the cossetting cylinder for rotating the same independently of the feeding worm, and a casing surrounding the exterior of the cossetting cylinder in spaced relation thereto for receiving the cossettes and having a discharge opening in its base.

WALTER H. HANNI.
JOHN W. McFARLAND.